US010819166B2

(12) United States Patent
Liu

(10) Patent No.: US 10,819,166 B2
(45) Date of Patent: Oct. 27, 2020

(54) WIRELESS POWER TRANSFER SYSTEM WITH POSITIONING FUNCTION

(71) Applicant: RICHTEK TECHNOLOGY CORPORATION, Zhubei, Hsinchu (TW)

(72) Inventor: Kuo-Chi Liu, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 176 days.

(21) Appl. No.: 16/122,988

(22) Filed: Sep. 6, 2018

(65) Prior Publication Data

US 2019/0148992 A1     May 16, 2019

Related U.S. Application Data

(60) Provisional application No. 62/586,073, filed on Nov. 14, 2017.

(30) Foreign Application Priority Data

Jun. 1, 2018    (CN) .......................... 2018 1 0558085

(51) Int. Cl.
*H02J 50/90*      (2016.01)
*H02J 50/12*      (2016.01)

(52) U.S. Cl.
CPC .............. *H02J 50/90* (2016.02); *H02J 50/12* (2016.02)

(58) Field of Classification Search
CPC .................................. H02J 50/90; H02J 50/12
See application file for complete search history.

(56) References Cited

U.S. PATENT DOCUMENTS

| | | | |
|---|---|---|---|
| 2012/0235506 A1* | 9/2012 | Kallal | H04B 5/0075 307/104 |
| 2019/0027969 A1* | 1/2019 | Staring | H02J 7/025 |

* cited by examiner

*Primary Examiner* — Carlos Amaya
(74) *Attorney, Agent, or Firm* — Tung & Associates

(57) ABSTRACT

A wireless power transfer system includes: a transmitting side, which includes a resonant transmitting circuit, the resonant transmitting circuit including a transmitter coil; and a receiving side, which includes a resonant receiving circuit, the resonant receiving circuit including a receiver coil for performing induction with the transmitter coil to generate a resonant receiver voltage, wherein the transmitter adjusts a transmitter current of the resonant transmitting circuit according to the resonant receiver voltage such that the resonant receiver voltage is regulated to a target voltage level. The wireless power transfer system determines a shift distance from a present relative position to an optimal relative position according to the adjusted transmitter current of the resonant transmitting circuit.

10 Claims, 9 Drawing Sheets

WIRELESS POWER TRANSFER SYSTEM WITH POSITIONING FUNCTION

CROSS REFERENCE

The present invention claims priority to U.S. 62/586,073, filed on Nov. 14, 2017, and to CN 201810558085.3, filed on Jun. 1, 2018.

BACKGROUND OF THE INVENTION

Field of Invention

The present invention relates to a wireless power transfer system; particularly, it relates to a wireless power transfer system with positioning function.

Description of Related Art

In a typical wireless power transfer system, there is an optimal relative position between the power transmitting side and the power receiving side. When the power transmitting side and the power receiving side are located at the optimal relative position with respect to each other, the optimal power transfer efficiency can be achieved. On the other hand, when the power transmitting side and the power receiving side are not well aligned, that is, the present relative position between the power transmitting side and the power receiving side is away from the optimal relative position, the power transfer efficiency is reduced. In this case, to raise the power received by the power receiving side to a target level, if the power transmitting side increases the current it transmits, the power transmitting side may suffer overheat since more power has to be transmitted; and the overheat triggers a protection function, the transmitted power will be lowered to further reduce the power transfer efficiency. Hence, it is important to detect the distance (referred to as "shift distance" hereinafter) from the optimal relative position and provide to a user a suggestion as to how to adjust the relative position or distance between the power transmitting side and the power receiving side.

FIG. 1 shows a typical characteristic chart of a wireless power transfer system. In FIG. 1, the x-axis shows the shift distance from the present relative position, to the optimal relative position, between the power transmitting side and the power receiving side; the shift distance is larger to the righter part along the x-axis direction. The y-axis shows the power loss between the power transmitting side and the power receiving side; the power loss is higher to the upper part along the y-axis direction. The characteristic chart of FIG. 1 indicates that the power loss is higher as the shift distance becomes larger.

US patent 20160204616 discloses a prior art wireless power transfer system. In this prior art, the power transmitting side provides a steady power, and the power receiving side determines an optimal relative position between the power transmitting side and the power receiving side when a sensing voltage sensed by the power receiving side achieves its highest level. This prior art circuit has a drawback that it can operate only during the ping phase. During the power transfer phase, the relative position of the receiving side cannot be sensed, and consequently the optimal relative position of the power receiving side cannot be determined.

US patent 20160094043 discloses another prior art wireless power transfer system. In this prior art, the power of the power transmitting side and the power receiving side are sensed at the same time to calculate the real time power transfer efficiency between the power transmitting side and the power receiving side. This prior art circuit has a drawback that it can operate only during the power transfer phase. Whether the power receiving side is at the optimal relative position cannot be determined during the ping phase or the negotiation phase. Besides, the circuit of the prior art is complex and costs higher since the information of the voltages and currents of both the power transmitting side and the power receiving side are required for calculating the real time power transfer efficiency.

Compared to the prior art circuits mentioned above, the present invention is advantageous in being able to determine the optimal relative position rapidly during the ping phase, the negotiation phase, and the power transfer phase.

SUMMARY OF THE INVENTION

From one perspective, the present invention provides a wireless power transfer system, comprising: a power transmitting side, which includes a resonant transmitting circuit and a control unit, wherein the control unit controls the resonant transmitting circuit, and the resonant transmitting circuit includes a transmitter coil; and a power receiving side, which includes a resonant receiving circuit, wherein the resonant receiving circuit includes a receiver coil configured to operably generate a resonant receiver voltage by induction with the transmitter coil, wherein the power receiving side has an optimal relative position relatively to the power transmitting side and at the optimal relative position power transfer efficiency between the power transmitting side and the power receiving side is optimal; wherein when the resonant transmitting circuit and the resonant receiving circuit power transfer by the induction at a present relative position, the power receiving side sends a voltage level signal according to the resonant receiver voltage to the control unit to adjust a transmitter current of the resonant transmitting circuit, such that the resonant receiver voltage is regulated to a target voltage level; wherein the wireless power transfer system determines a shift distance from the present relative position to the optimal relative position according to the adjusted transmitter current of the resonant transmitting circuit.

In one embodiment, the wireless power transfer system further comprises an indicator device which is configured to indicate the shift distance as a suggestion for a user to move the power receiving side.

In one embodiment, the adjusted transmitter current of the resonant transmitting circuit relates to a transmitter coil current flowing through the transmitter coil or a transmitter coil voltage across the transmitter coil; or the power transmitting side further includes a resonant capacitor coupled in series with the transmitter coil, and the adjusted transmitter current of the resonant transmitting circuit relates to a voltage drop across the resonant capacitor.

In one embodiment, the shift distance is positively correlated to the transmitting coil current of the resonant transmitting circuit or the voltage drop across the resonant capacitor.

In one embodiment, the power transmitting side further includes a power inverter coupled between the first DC voltage and the resonant transmitting circuit, wherein the control unit controls the power inverter to convert the first DC voltage to generate the transmitter current of the resonant transmitting circuit; or the power transmitting side further includes a DC/DC converter coupled to the power inverter, wherein the DC/DC converter is configured to operably convert a second DC voltage to the first DC voltage for the power inverter to generate the transmitter current of the resonant transmitting circuit.

In one embodiment, the transmitter current of the resonant transmitting circuit is controlled by one of the following methods: (1) adjusting a duty ratio of the power inverter; (2) adjusting an operation frequency of the power inverter; or (3) the control unit controlling the DC/DC converter to adjust the first DC voltage, so as to adjust the voltage provided to the resonant transmitting circuit by the power inverter.

In one embodiment, the power transmitting side further includes a sensor configured to operably sense the transmitter coil current, the transmitter coil voltage or the voltage drop across the resonant capacitor.

In one embodiment, the sensor further receives a power related signal from the control unit to normalize the transmitter coil current, the transmitter coil voltage or the voltage drop across the resonant capacitor to a normalized signal for determining the shift distance, wherein the power related signal relates to a load of the power transmitting side.

In one embodiment, the wireless power transfer system further comprises an indicator device which compares the normalized signal with at least one threshold to generate an indication signal as a suggestion for a user to move the power receiving side, wherein the indication signal corresponds to the shift distance.

In one embodiment, the resonant receiving circuit generates the voltage level signal according to a difference between the target voltage level and the resonant receiver voltage.

In one embodiment, the sensor further generates a real power related signal according to the transmitter coil current, the transmitter coil voltage or the voltage drop across the resonant capacitor for normalizing the transmitter coil current, the transmitter coil voltage or the voltage drop across the resonant capacitor to determine the shift distance, wherein the real power related signal is related to the load of the power receiving side.

From another perspective, the present invention provides a wireless power transfer system, comprising: a power transmitting side, which includes a resonant transmitting circuit and a control unit, wherein the control unit controls the resonant transmitting circuit, and the resonant transmitting circuit includes a transmitter coil and a resonant capacitor coupled in series with the transmitter coil; a power receiving side, which includes a resonant receiving circuit, wherein the resonant receiving circuit includes a receiver coil configured to operably generate a resonant receiver voltage by induction with the transmitter coil, wherein the power receiving side has an optimal relative position relatively to the power transmitting side and at the optimal relative position power transfer efficiency between the power transmitting side and the power receiving side is optimal; wherein when the resonant transmitting circuit and the resonant receiving circuit perform the power induction at a present relative position, the power receiving side sends a voltage level signal according to the resonant receiver voltage to the control unit to adjust a transmitter current of the resonant transmitting circuit, such that the resonant receiver voltage is regulated to a target voltage level; and a sensor, configured to operably sense a transmitter coil current, a transmitter coil voltage of the transmitter coil or a voltage drop across the resonant capacitor to generate a reactive power related signal; wherein the wireless power transfer system determines a shift distance from the present relative position to the optimal relative position according to the reactive power related signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
FIG. 1 shows a typical characteristic chart of a wireless power transfer system, showing the power loss vs. the shift distance from the optimal relative position.
Figure 2:
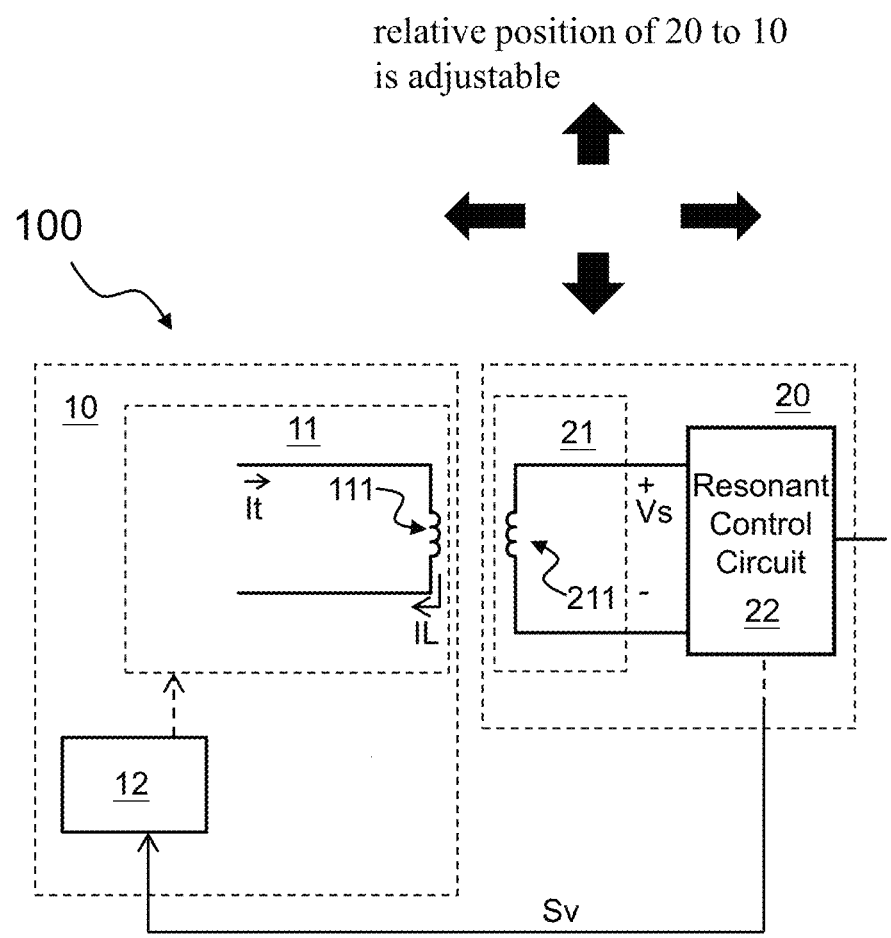
FIGS. 2, 3, and 4 show schematic diagrams of embodiments of the wireless power transfer system of present invention.

Referring to FIG. 2, from one perspective, the present invention provides a wireless power transfer system comprising a power transmitting side 10 and a power receiving side 20. The power transmitting side 10 includes a resonant transmitting circuit 11 and a control unit 12, wherein the control unit 12 controls the resonant transmitting circuit 11. The resonant transmitting circuit 11 includes a transmitter coil 111. The power receiving side 20 includes a resonant receiving circuit 21, wherein the resonant receiving circuit 21 includes a receiver coil 211 configured to operably generate a resonant receiver voltage Vs by induction with the transmitter coil 111. The resonant receiving circuit 21 has a target voltage level. During induction between the transmitter coil 111 and the receiver coil 211, the resonant receiving circuit 21 maintains or regulates the resonant receiver voltage Vs to the target voltage level. In one embodiment, when the resonant transmitting circuit 11 and the resonant receiving circuit 21 perform power transfer by the induction, the power receiving side 20 generates a voltage level signal Sv according to the resonant receiver voltage Vs and sends the voltage level signal Sv to the control unit 12 to adjust a transmitter current It of the resonant transmitting circuit 11, such that the resonant receiver voltage Vs is regulated to the target voltage level. As an example, when the resonant receiver voltage Vs is lower than the target voltage level, the power receiving side 20 sends the voltage level signal Sv to the control unit 12 to raise the transmitter current It of the resonant transmitting circuit 11, such that the resonant receiver voltage Vs is regulated to the target voltage level. The voltage level signal Sv can be transmitted by the resonant control circuit through wires, wireless field, sound waves or light.

In one preferred embodiment, the resonant receiving circuit 21 generates the voltage level signal Sv according to a difference between the target voltage level and the resonant receiver voltage Vs. The voltage level signal Sv is sent to the control unit 12 to adjust the transmitter current It of the resonant transmitting circuit 11, such that the resonant receiver voltage Vs is regulated to the target voltage level. For example, when the resonant receiver voltage Vs is much lower than the target voltage level, the voltage level signal Sv sent to the control unit 12 can greatly raise the transmitter current It of the resonant transmitting circuit 11. Conversely, when the resonant receiver voltage Vs is just a little lower than the target voltage level, the voltage level signal Sv sent to the control unit 12 can just mildly raise the transmitter current It of the resonant transmitting circuit 11. The details of adjusting the transmitter current It of the resonant transmitting circuit 11 will be described later.

In the present invention (e.g. the wireless power transfer system 100), the relative position between the power transmitting side 10 and the power receiving side 20 is adjustable, and there is an optimal relative position between the power transmitting side 10 and the power receiving side 20. When the power transmitting side 10 and the power receiving side 20 are located at the optimal relative position with respect to each other, the optimal power transfer efficiency can be achieved. On the other hand, when the power transmitting side 10 and the power receiving side 20 are not well aligned, that is, the present relative position between the power transmitting side 10 and the power receiving side 20 is away from the optimal relative position, the power transfer efficiency is reduced. From one perspective, the "optimal relative position" is not necessarily a specific point but may be understood as an area range in which the power transfer efficiency is better; in this area range (i.e., in the "optimal relative position"), the power transfer efficiency is higher than a predetermined efficiency threshold.

Still referring to FIG. 2, the wireless power transfer system 100 of the present invention can determine the shift distance from the present relative position to the optimal relative position according to the adjusted transmitter current It of the resonant transmitting circuit 11. Note that the "adjusted" transmitter current It refers to a transmitter current It which has been adjusted in order to regulate the resonant receiver voltage Vs to the target voltage level. In other words, the "adjusted" transmitter current It is the transmitter current It when the resonant receiver voltage Vs has been regulated to the target voltage level. The term "adjusted" in other occurrences of the specification means similarly.

Figure 3:
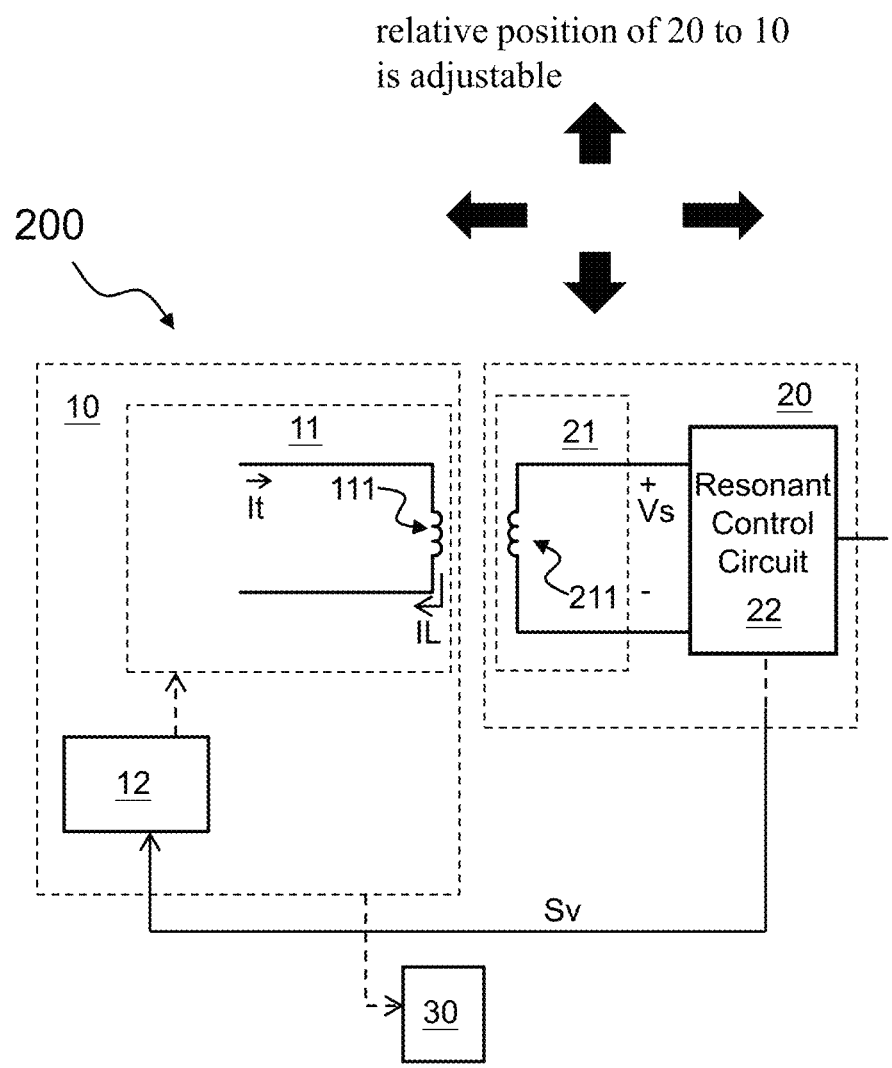

Referring to FIG. 3, in one preferred embodiment, the wireless power transfer system 200 further comprises an indicator device 30 which is configured to indicate the shift distance as a suggestion for a user to move the power receiving side 20. The user can move or change the relative position between the power receiving side 20 and the power transmitting side 10 to the optimal relative position to achieve the best power transfer efficiency. The indicator device 30 can be located in the power transmitting side 10 or in the power receiving side 20, or external to the power transmitting side 10 and the power receiving side 20, depending on the requirements from the user. Besides, the shift distance can be displayed or indicated by images, text, sound, light or colors, and etc.

Figure 4:
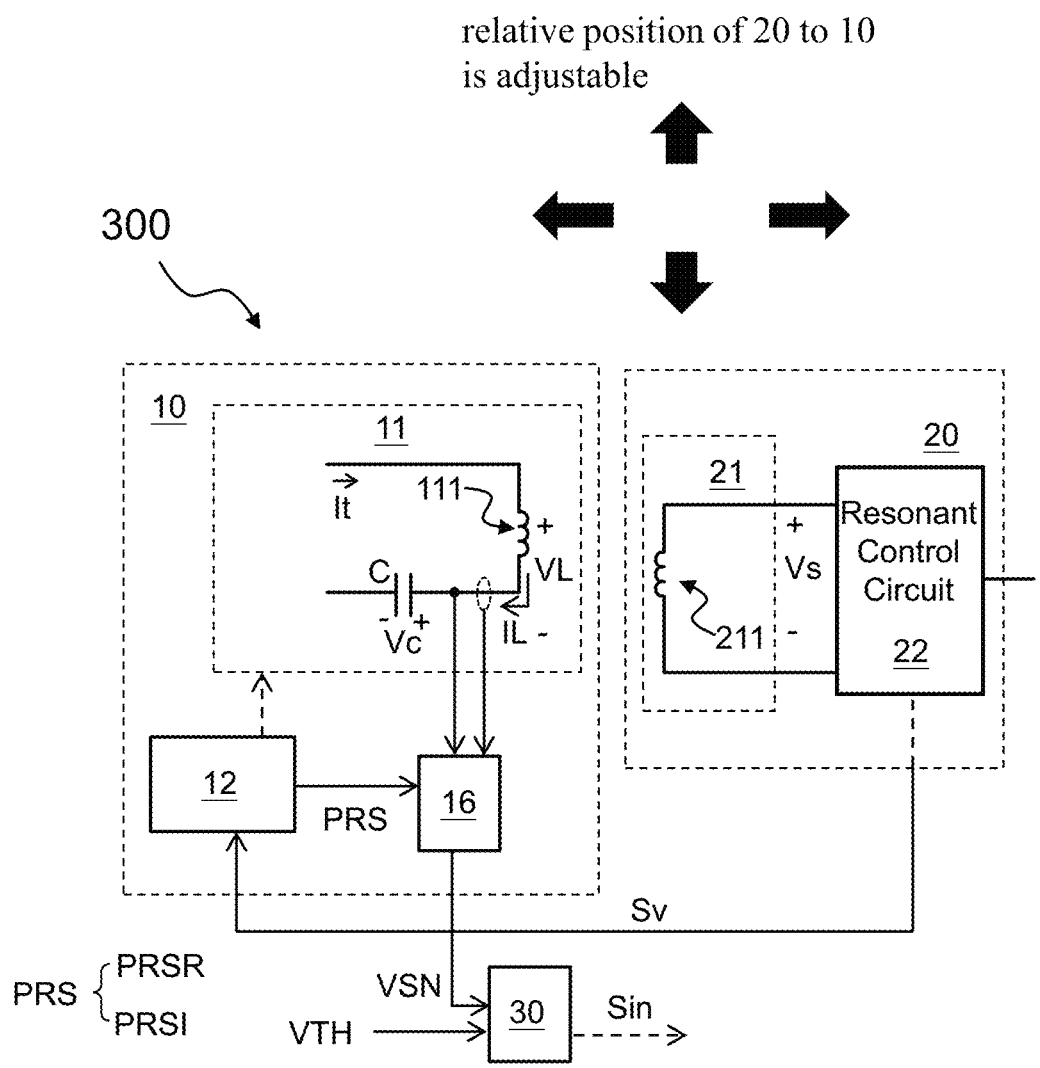

Also referring to FIG. 4, in the wireless power transfer system 300, the power transmitting side further includes a resonant capacitor C coupled in series with the transmitter coil 111. Referring to FIGS. 3 and 4, in one preferred embodiment, the adjusted transmitter current It of the resonant transmitting circuit 11 relates to a transmitter coil current IL flowing through the transmitter coil 111, a transmitter coil voltage VL across the transmitter coil 111, or a voltage drop Vc across the resonant capacitor C. In other words, the transmitter current It of the resonant transmitting circuit 11 can be sensed and/or adjusted by sensing and/or adjusting the transmitter coil current IL flowing through the transmitter coil 111, the transmitter coil voltage VL across the transmitter coil 111, or the voltage drop Vc across the resonant capacitor C.

In one embodiment, when the power receiving side 20 is closer to the optimal relative position, the efficiency of the power induction is higher, and the adjusted transmitter coil current IL flowing through the transmitter coil 111 or the voltage drop Vc across the resonant capacitor C, corresponding to the target voltage level, is lower. Conversely, when the power receiving side 20 is farer from the optimal relative position, the efficiency of the power induction is lower, and the adjusted transmitter coil current IL flowing through the transmitter coil 111 or the voltage drop Vc across the resonant capacitor C, corresponding to the target voltage level, is higher. In other words, the shift distance is substantially positively correlated to the adjusted transmitter coil current IL flowing through the resonant transmitter coil 111 or the voltage drop Vc across the resonant capacitor C.

Figure 5:
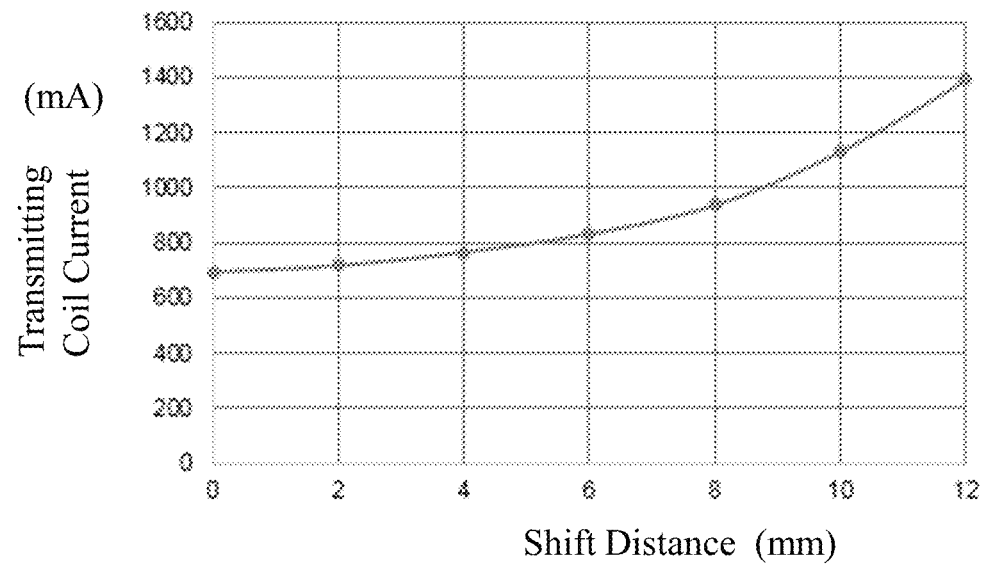
FIG. 5 shows a schematic characteristic chart of the transmitter coil current vs. the shift distance of the wireless power transfer system of present invention.
Figure 6:
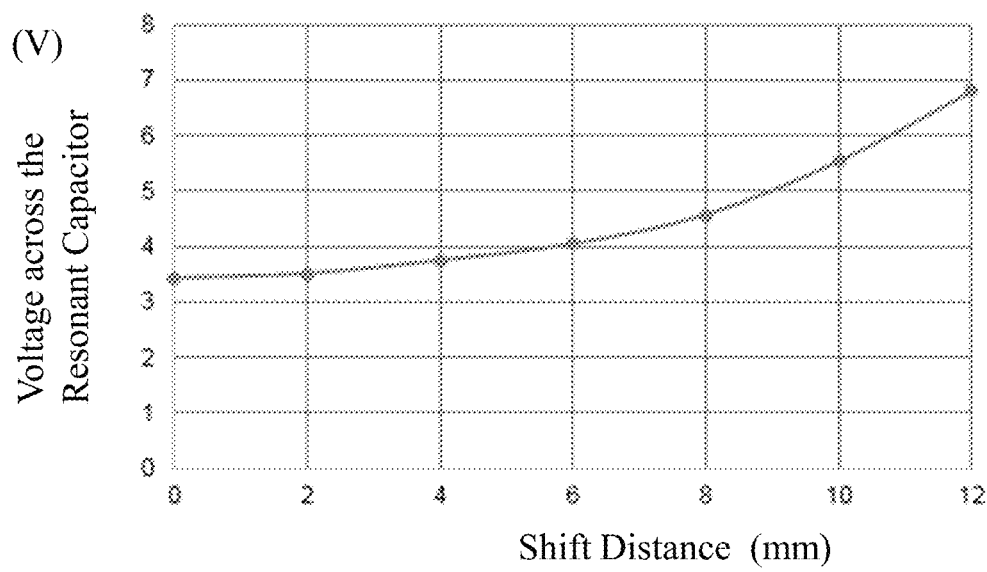
FIG. 6 shows a schematic characteristic chart of the voltage across the resonant capacitor vs. the shift distance of the wireless power transfer system of present invention.

FIGS. 5 and 6 respectively show characteristic charts of the transmitter coil current IL and the voltage drop Vc across the resonant capacitor C versus the shift distance. As shown in the figures, when the shift distance is closer to 0 (i.e. the power receiving side 20 is closer to the optimal relative position), the adjusted transmitter coil current IL (FIG. 5) or the voltage drop Vc across the resonant capacitor C (FIG. 6), corresponding to the target voltage level, is lower. Conversely, as the shift distance is increasing (i.e. the power receiving side 20 is farer from the optimal relative position), the adjusted transmitter coil current IL (FIG. 5) or the voltage drop Vc across the resonant capacitor C (FIG. 6), corresponding to the target voltage level, is higher. Note that, the embodiments shown in FIGS. 5 and 6 correspond to the ping phase or the negotiation phase of the wireless power transfer system, wherein the power receiving side 20 is at zero or very light load condition. Since the level of the adjusted transmitter coil current IL or the voltage drop Vc across the resonant capacitor C is positively correlated to the shift distance, information of the shift distance can be obtained according to the adjusted transmitter coil current IL or the voltage drop Vc across the resonant capacitor C. The shift distance can then be provided to the user as a reference for moving the power receiving side 20, which will be described later.

Still referring to FIG. 4, in one embodiment, the power transmitting side 10 further includes a sensor 16 configured to operably sense the transmitter coil current IL, the transmitter coil voltage VL or the voltage drop Vc across the resonant capacitor C.

Still referring to FIG. 4, in one embodiment, the sensor 16 further receives a power related signal PRS from the control unit 12 to normalize the transmitter current It, the transmitter coil current IL, the transmitter coil voltage VL or the voltage drop Vc across the resonant capacitor C to generate a normalized signal VSN for determining the shift distance. The power related signal PRS relates to a load of the power transmitting side 10. The load of the power transmitting side 10 relates to for example a supply voltage, a supply current or a supply power supplied by the power transmitting side 10. From one perspective, the load of the power transmitting side 10 also relates to a load of the power receiving side 20.

Figure 7:
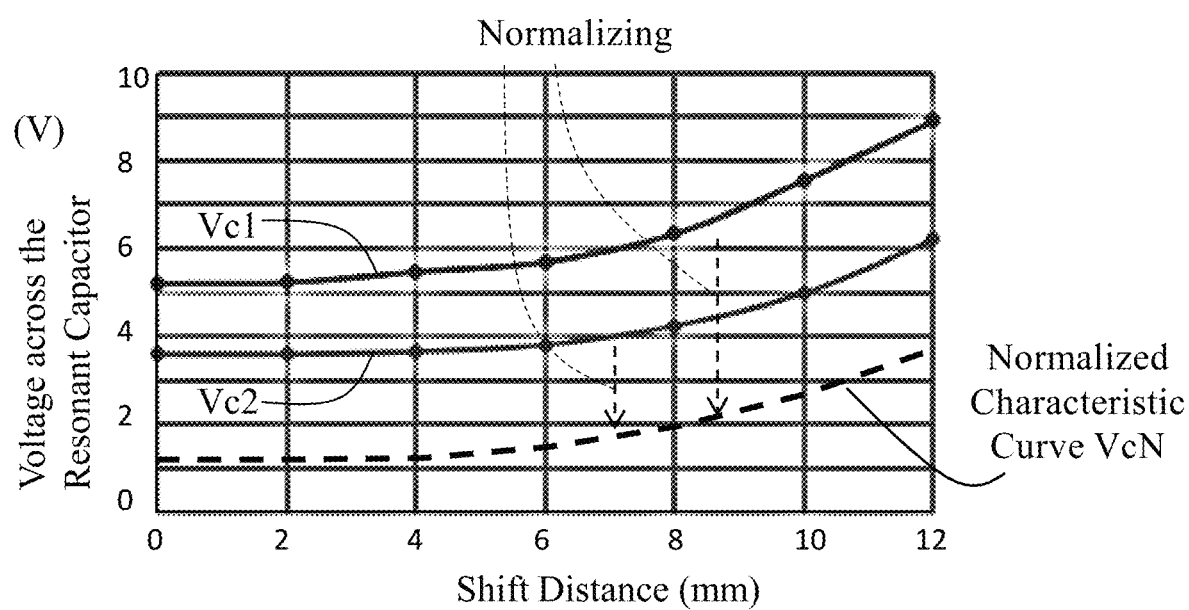
FIG. 7 shows schematic characteristic charts of the voltages across the resonant capacitor vs. the shift distance of the wireless power transfer system of present invention with different load conditions.

Also referring to FIG. 7, one of the two curves shows an adjusted voltage drop Vc1 across the resonant capacitor C under a higher load condition, and the other of the two curves shows an adjusted voltage drop Vc2 across the resonant capacitor C with a lower load condition. As shown by the curves Vc1 and Vc2 in the figure, regardless of the load condition, when the shift distance is smaller (i.e. the power receiving side 20 is closer to the optimal relative position), the corresponding voltage drop across the resonant capacitor C is lower, and when the shift distance is larger (i.e. the power receiving side 20 is farer from the optimal relative position), the corresponding voltage drop across the resonant capacitor C is higher. Both the curves Vc1 and Vc2 show similar trend. Normalization removes components related to the load conditions and generates a normalized characteristic curve (e.g. the dashed curve VcN), for easier and simpler calculation to obtain the shift distance for user's reference. Note that, all the numbers shown in FIGS. 5, 6 and 7 are for illustrative purpose and not for limiting the scope of the present invention.

As shown in FIGS. 5, 6 and 7 as well as the corresponding descriptions, the wireless power transfer system of the present invention is applicable in ping phase, negotiation phase (corresponding to FIGS. 5 and 6, zero load) and also in power transfer phase (corresponding to FIG. 7 with various load conditions), for determining and providing the shift distance for user's reference, to assist a user to better position the power transmitting side 10 and the power receiving side 20 of the wireless power transfer system.

Still referring to FIG. 4, in one embodiment, the indicator device 30 compares the normalized signal VSN (for example corresponding to a point in the aforementioned curve VcN) with at least one threshold VTH to generate an indication signal Sin as a suggestion for a user to move the power receiving side 20, wherein the indication signal Sin is indicative of, or corresponds to, the shift distance. In one embodiment, the threshold VTH can include a first threshold VTH1 corresponding to the optimal relative position, for determining whether the power receiving side 20 is at the optimal relative position relative to the power transmitting side 10. In another embodiment, the threshold VTH can include a second threshold VTH2 for determining whether the power receiving side 20 is a little far from the optimal relative position to guide the user to change the position of the power receiving side 20. In yet another embodiment, the threshold VTH can include a third threshold VTH3 for determining whether the power receiving side 20 is too far from the optimal relative position. In the latter case wherein the power receiving side 20 is too far from the optimal relative position, in one embodiment, the wireless power transfer system can send a warning signal and/or stop providing power so that the transmitter current It of the resonant transmitting circuit will not be overly high. The levels of these thresholds can be determined by the user according to requirements and the applications of the system. In one embodiment, the indication signal Sin can be displayed by for example a multi-segment LED indicator, or an LED with different flashing frequencies, to represent corresponding shift distances. If the power receiving side is embodied in a cell phone, the indication signal Sin can be displayed in a display panel of the cell phone to show the corresponding shift distance.

From another perspective, the operation principle of the power transmitting side 10 of the wireless power transfer system of the present invention can be illustrated by simplified equations. FIG. 10 shows a schematic diagram of an equivalent circuit of the wireless power transfer system of present invention (corresponding to for example FIGS. 4, 8 and 9). The equivalent impedance Zeq of the power transmitting side 10 is shown as the following equation:

$$Zeq = \frac{(\omega M)^2}{RL + RS + j(\omega LS - 1/\omega CS)}$$

wherein ω is the operating frequency, RL is the load resistance, RS is the equivalent series resistance of the resonant receiving circuit 21, LS is the equivalent inductance of the receiver coil 211, and CS is the equivalent capacitance of the receiver coil 211.

The mutual inductance is shown as the following equation:

$$M = k\sqrt{LP*LS}$$

wherein LP is the equivalent inductance of the transmitter coil 111, k is the coupling coefficient between the transmitter coil 111 and the receiver coil 211. When the power receiving side 20 is closer to the optimal relative position, the coupling coefficient k is higher. When the power receiving side 20 is farer from the optimal relative position, the coupling coefficient k is lower.

The transmitter current It of the resonant transmitting circuit 10 is shown as the following equation:

$$It = \frac{V_{in}}{RL + Zeq + j(\omega LP - 1/\omega CP)}$$

wherein CP is the equivalent capacitance of the resonant capacitor C, and Vin is the input voltage of the resonant transmitting circuit 11.

The resonant receiver voltage Vs of the receiver coil 211 is shown as the following equation:

$$V_s = j\omega M * It$$

The output voltage Vo of the resonant receiving circuit 21 is shown as the following equation:

$$V_o = \frac{j\omega M * It * RL}{RL + RS + j(\omega LS - 1/\omega CS)}$$

wherein RL is the equivalent load resistance of the resonant receiving circuit 21.

As shown in the equations above, when adjusting the transmitter current It of the resonant transmitting circuit 10 to regulate the resonant receiver voltage Vs of the power receiving side 20 to the target voltage level, the efficiency of electro-magnetic power induction is higher as the power receiving side 20 is closer to the optimal relative position (i.e. the shift distance is smaller), wherein the equivalent impedance Zeq is higher and the adjusted transmitter current It is lower. In other words, when the power receiving side 20 is closer to the optimal relative position, a relatively lower adjusted transmitter current It can keep the resonant receiver voltage Vs of the power receiving side 20 at the target voltage level, while, when the power receiving side 20 is farer from the optimal relative position (i.e. larger shift distance), a relatively higher adjusted transmitter current It is required to keep the resonant receiver voltage Vs of the power receiving side 20 at the target voltage level.

Thus, as shown in the figures and in the equations above, when the power receiving side 20 is closer to the optimal relative position, the adjusted transmitter current It of the resonant transmitting circuit 10, the transmitter coil current IL, or the voltage drop Vc across the resonant capacitor C, corresponding to the target voltage level, is lower. Conversely, when the power receiving side 20 is farer from the optimal relative position, the adjusted transmitter current It of the resonant transmitting circuit 10, the transmitter coil current IL, or the voltage drop Vc across the resonant capacitor C, corresponding to the target voltage level, is higher.

The shift distance of the power receiving side 20 from the optimal relative position and the real load condition can be reflected by the equivalent impedance Zeq of the power transmitting side 10. More specifically, the shift distance can be reflected by the reactance of the equivalent impedance Zeq of the power transmitting side 10, and the real load condition can be reflected by the resistance of the equivalent impedance Zeq of the power transmitting side 10. Therefore, the information about the shift distance and the real load condition of the power receiving side 20 can be obtained by sensing the reactive power and the real power respectively.

Figure 8:
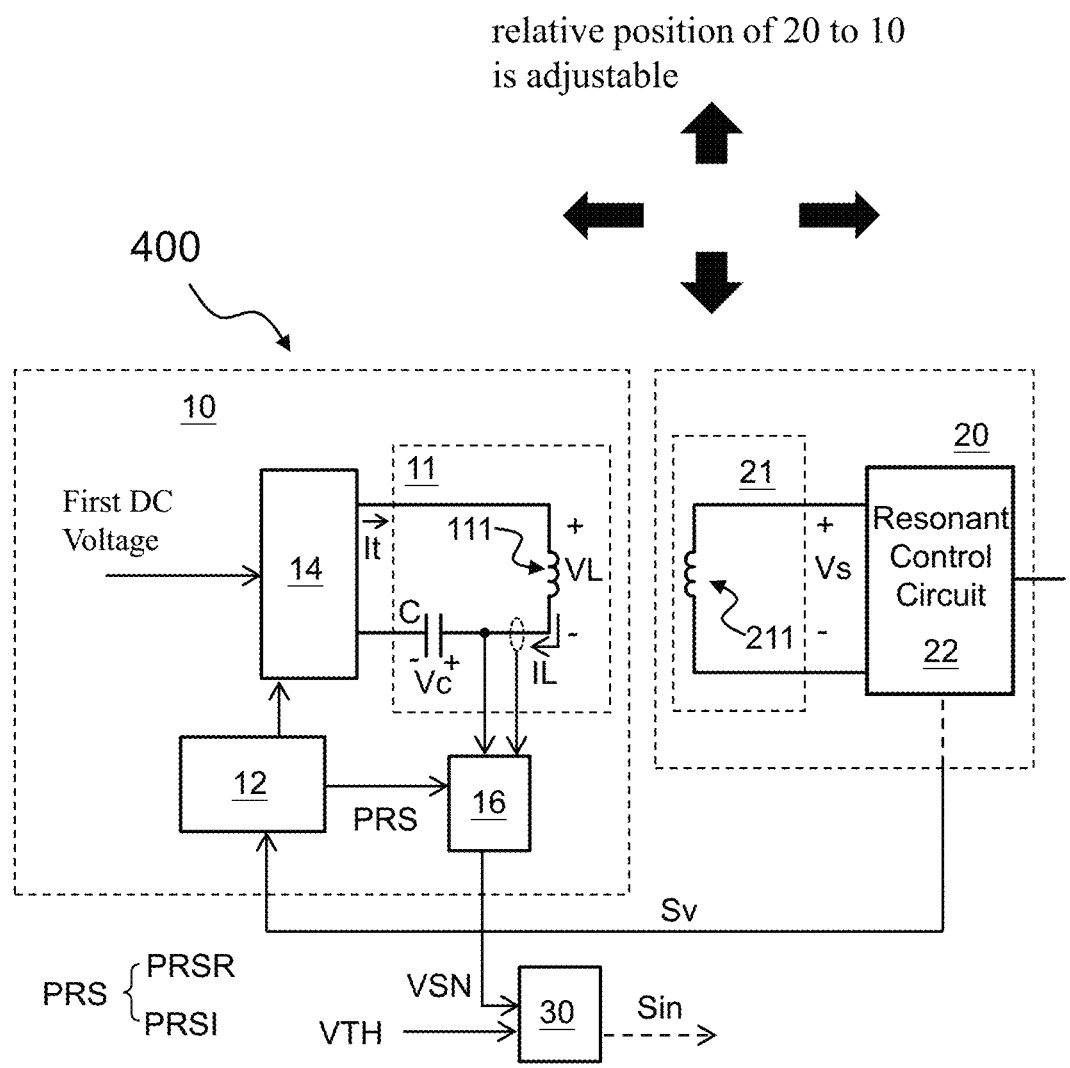
FIGS. 8 and 9 show schematic diagrams of embodiments of the wireless power transfer system of present invention.
Figure 9:
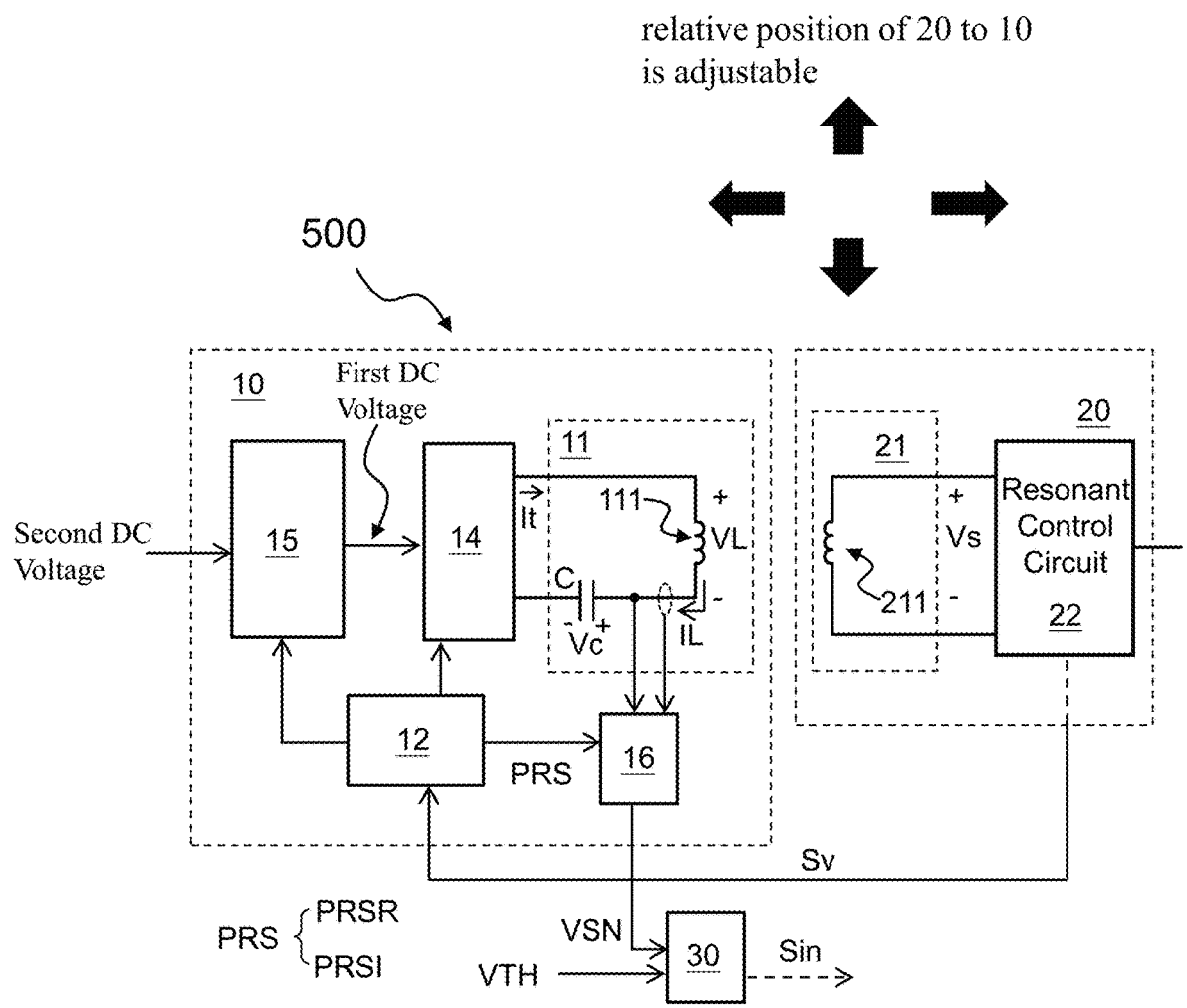
Figure 10:
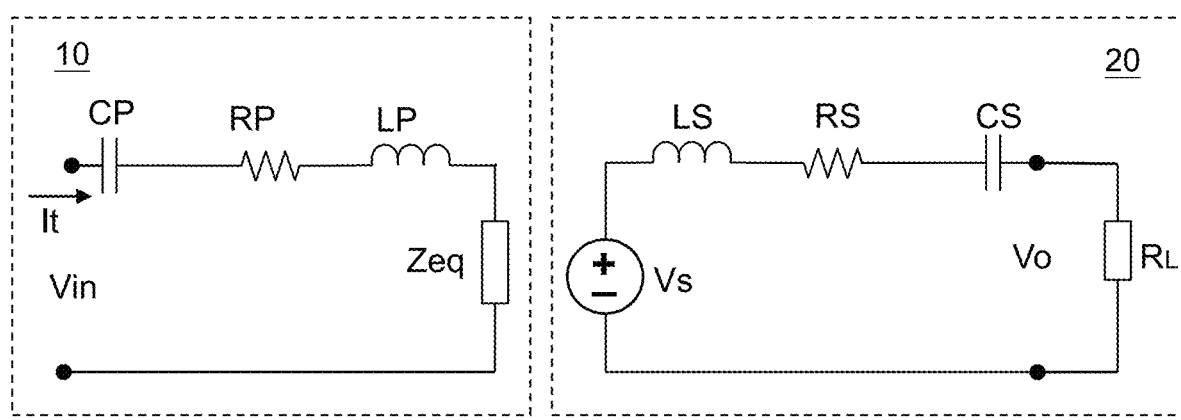
FIG. 10 shows a schematic diagram of an equivalent circuit of the wireless power transfer system of present invention.

Still referring to FIGS. 4, 8 and 9, in one embodiment, the aforementioned power related signal PRS can include a real power related signal PRSR and/or a reactive power related signal PRSI. According to the present invention, in one embodiment, the sensor 16 as shown in FIGS. 4, 8 and 9 can be configured to operably generate a real power related signal (such as the real power related signal PRSR as shown in FIGS. 4, 8 and 9) according to the transmitter coil current IL, the transmitter coil voltage VL or the voltage drop Vc across the resonant capacitor C, for normalizing the transmitter coil current IL, the transmitter coil voltage VL or the voltage drop Vc across the resonant capacitor C to determine the shift distance, wherein the real power related signal PRSR is related to the load of the power receiving side 20.

According to the present invention, in one embodiment, the sensor 16 as shown in FIGS. 4, 8 and 9 can be configured to operably generate a reactive power related signal (such as the real power related signal PRSI as shown in FIGS. 4, 8 and 9) according to the transmitter coil current IL, the transmitter coil voltage VL or the voltage drop Vc across the resonant capacitor C. The wireless power transfer system of the present invention (such as 300, 400 or 500) can determine a shift distance from the present relative position to the optimal relative position according to the reactive power related signal PRSI.

Referring to FIG. 8, in one preferred embodiment according to the present invention (i.e. the wireless power transfer system 400), the power transmitting side 10 further includes a power inverter 14 coupled between the first DC voltage and the resonant transmitting circuit 11, wherein the control unit 12 controls the power inverter 14 to convert the first DC voltage to generate the transmitter current It of the resonant transmitting circuit 11. In one embodiment, the power inverter 14 is coupled with the transmitter coil 111 and the resonant capacitor C in parallel. Referring to FIG. 9, in one preferred embodiment (i.e. the wireless power transfer system 500), the power transmitting side 10 further includes a DC/DC converter 15 coupled to the power inverter 14 to convert a second DC voltage to the first DC voltage provided to the power inverter 14 to generate the transmitter current It of the resonant transmitting circuit 11.

In one preferred embodiment, the transmitter current It of the resonant transmitting circuit 11 is controlled by one of the following methods: (1) adjusting a duty ratio of the power inverter 14; (2) adjusting an operation frequency of the power inverter 14; or (3) the control unit 12 controlling the DC/DC converter 15 to adjust the first DC voltage, so as to adjust the voltage provided to the resonant transmitting circuit 11 by the power inverter 14, whereby the transmitter current It of the resonant transmitting circuit 11 is adjusted. More specifically, the frequency spectrum of the electromagnetic signal generated by the transmitter coil 111 can be controlled by adjusting the duty ratio of the power inverter 14. In other words, the resonance level can be adjusted according to the duty ratio, to increase or reduce the power transferred from the power transmitting side 10 to the power receiving side 20. For example, when the duty ratio is closer to 50%, the power transferred from the power transmitting side 10 to the power receiving side 20 is increased, and when the duty ratio is away from 50%, the power transferred from the power transmitting side 10 to the power receiving side 20 is reduced. Or, in another embodiment, the resonance of the electro-magnetic signal generated by the transmitter coil 111 can be controlled by adjusting the operating frequency of the power inverter 14, so as to adjust the transmitter current It and to control the power transferred from the power transmitting side 10 to the power receiving side 20.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A wireless power transfer system, comprising:
    a power transmitting side, which includes a resonant transmitting circuit, a sensor and a control unit, wherein the control unit controls the resonant transmitting circuit, and the resonant transmitting circuit includes a transmitter coil; and
    a power receiving side, which includes a resonant receiving circuit, wherein the resonant receiving circuit includes a receiver coil configured to operably generate a resonant receiver voltage by induction with the transmitter coil, wherein the power receiving side has an optimal relative position relatively to the power transmitting side and at the optimal relative position power transfer efficiency between the power transmitting side and the power receiving side is optimal;

wherein when the resonant transmitting circuit and the resonant receiving circuit power transfer by the induction at a present relative position, the power receiving side sends a voltage level signal according to the resonant receiver voltage to the control unit to adjust a transmitter current of the resonant transmitting circuit, such that the resonant receiver voltage is regulated to a target voltage level;

wherein the wireless power transfer system determines a shift distance from the present relative position to the optimal relative position according to the adjusted transmitter current of the resonant transmitting circuit;

wherein the adjusted transmitter current of the resonant transmitting circuit relates to a transmitter coil current flowing through the transmitter coil or a transmitter coil voltage across the transmitter coil; or the power transmitting side further includes a resonant capacitor coupled in series with the transmitter coil, and the adjusted transmitter current of the resonant transmitting circuit relates to a voltage drop across the resonant capacitor;

wherein the sensor is configured to operably sense the transmitter coil current, the transmitter coil voltage or the voltage drop across the resonant capacitor, and receive a power related signal from the control unit to normalize the transmitter coil current, the transmitter coil voltage or the voltage drop across the resonant capacitor to a normalized signal for determining the shift distance, wherein the power related signal relates to a load of the power transmitting side.

2. The wireless power transfer system of claim 1, wherein the wireless power transfer system further comprises an indicator device which is configured to indicate the shift distance as a suggestion for a user to move the power receiving side.

3. The wireless power transfer system of claim 1, wherein the shift distance is positively correlated to the transmitting coil current of the resonant transmitting circuit or the voltage drop across the resonant capacitor.

4. The wireless power transfer system of claim 3, wherein the power transmitting side further includes a power inverter coupled between a first DC voltage and the resonant transmitting circuit, wherein the control unit controls the power inverter to convert the first DC voltage to generate the transmitter current of the resonant transmitting circuit; or the power transmitting side further includes a DC/DC converter coupled to the power inverter, wherein the DC/DC converter is configured to operably convert a second DC voltage to the first DC voltage for the power inverter to generate the transmitter current of the resonant transmitting circuit.

5. The wireless power transfer system of claim 4, wherein the transmitter current of the resonant transmitting circuit is controlled by one of the following methods: (1) adjusting a duty ratio of the power inverter; (2) adjusting an operation frequency of the power inverter; or (3) the control unit controlling the DC/DC converter to adjust the first DC voltage, so as to adjust the voltage provided to the resonant transmitting circuit by the power inverter.

6. The wireless power transfer system of claim 1, further comprising an indicator device which compares the normalized signal with at least a threshold to generate an indication signal as a suggestion for a user to move the power receiving side, wherein the indication signal corresponds to the shift distance.

7. The wireless power transfer system of claim 1, wherein the resonant receiving circuit generates the voltage level signal according to a difference between the target voltage level and the resonant receiver voltage.

8. The wireless power transfer system of claim 1, wherein the sensor further generates a real power related signal according to the transmitter coil current, the transmitter coil voltage or the voltage drop across the resonant capacitor for normalizing the transmitter coil current, the transmitter coil voltage or the voltage drop across the resonant capacitor to determine the shift distance, wherein the real power related signal is related to the load of the power receiving side.

9. A wireless power transfer system, comprising:
a power transmitting side, which includes a resonant transmitting circuit and a control unit, wherein the control unit controls the resonant transmitting circuit, and the resonant transmitting circuit includes a transmitter coil and a resonant capacitor coupled in series with the transmitter coil;
a power receiving side, which includes a resonant receiving circuit, wherein the resonant receiving circuit includes a receiver coil configured to operably generate a resonant receiver voltage by induction with the transmitter coil, wherein the power receiving side has an optimal relative position relatively to the power transmitting side and at the optimal relative position power transfer efficiency between the power transmitting side and the power receiving side is optimal; wherein when the resonant transmitting circuit and the resonant receiving circuit perform the power induction at a present relative position, the power receiving side sends a voltage level signal according to the resonant receiver voltage to the control unit to adjust a transmitter current of the resonant transmitting circuit, such that the resonant receiver voltage is regulated to a target voltage level; and
a sensor, configured to operably sense a transmitter coil current, a transmitter coil voltage of the transmitter coil or a voltage drop across the resonant capacitor to generate a reactive power related signal;
wherein the wireless power transfer system determines a shift distance from the present relative position to the optimal relative position according to the reactive power related signal.

10. A wireless power transfer system, comprising:
a power transmitting side, which includes a resonant transmitting circuit, a sensor and a control unit, wherein the control unit controls the resonant transmitting circuit, and the resonant transmitting circuit includes a transmitter coil; and
a power receiving side, which includes a resonant receiving circuit, wherein the resonant receiving circuit includes a receiver coil configured to operably generate a resonant receiver voltage by induction with the transmitter coil, wherein the power receiving side has an optimal relative position relatively to the power transmitting side and at the optimal relative position power transfer efficiency between the power transmitting side and the power receiving side is optimal;
wherein when the resonant transmitting circuit and the resonant receiving circuit power transfer by the induction at a present relative position, the power receiving side sends a voltage level signal according to the resonant receiver voltage to the control unit to adjust a transmitter current of the resonant transmitting circuit, such that the resonant receiver voltage is regulated to a target voltage level;
wherein the wireless power transfer system determines a shift distance from the present relative position to the optimal relative position according to the adjusted transmitter current of the resonant transmitting circuit;

wherein the adjusted transmitter current of the resonant transmitting circuit relates to a transmitter coil current flowing through the transmitter coil or a transmitter coil voltage across the transmitter coil; or the power transmitting side further includes a resonant capacitor coupled in series with the transmitter coil, and the adjusted transmitter current of the resonant transmitting circuit relates to a voltage drop across the resonant capacitor;

wherein the sensor is configured to operably sense the transmitter coil current, the transmitter coil voltage or the voltage drop across the resonant capacitor, and generate a real power related signal according to the transmitter coil current, the transmitter coil voltage or the voltage drop across the resonant capacitor for normalizing the transmitter coil current, the transmitter coil voltage or the voltage drop across the resonant capacitor to determine the shift distance, wherein the real power related signal is related to the load of the power receiving side.

\* \* \* \* \*